United States Patent [19]

Takaba et al.

[11] Patent Number: 4,716,873
[45] Date of Patent: Jan. 5, 1988

[54] ENGINE CONTROL SYSTEM

[75] Inventors: Tetsuro Takaba; Tomotsugu Rikitake; Yoshitaka Tabara; Manabu Arima, all of Hiroshima, Japan

[73] Assignee: Mazda Motor Corporation, Hiroshima, Japan

[21] Appl. No.: 903,286

[22] Filed: Sep. 3, 1986

[30] Foreign Application Priority Data

Sep. 5, 1985 [JP] Japan .................. 60-196774

[51] Int. Cl.$^4$ ............................................. F02P 5/14
[52] U.S. Cl. ........................................ 123/425; 123/416
[58] Field of Search ............... 123/425, 421, 435, 399, 123/350, 427, 416

[56] References Cited

U.S. PATENT DOCUMENTS 4,527,524 7/1985 Giupard .......................... 123/425
4,620,518 11/1986 Nagai .............................. 123/425
4,625,690 12/1986 Morita ............................ 123/425

Primary Examiner—Raymond A. Nelli
Attorney, Agent, or Firm—Gerald J. Ferguson, Jr.; Michael P. Hoffman; Michael J. Foycik, Jr.

[57] ABSTRACT

An ignition timing correcting circuit which retards ignition timing when knock occurs and advances ignition timing when knock does not occur. An optimal ignition timing on which the ignition timing is to be converged is set to a latest ignition timing to which the ignition time can be retarded without raising the exhaust gas temperature higher than a predetermined value at the actual air-fuel ratio at that time. The actual ignition timing corrected by the ignition timing correcting circuit is compared with the optimal ignition timing. An air-fuel ratio control circuit corrects the air-fuel ratio toward the lean side when the actual ignition timing is on the advance side of the optimal ignition timing and toward the rich side when the former is on the retard side of the latter.

5 Claims, 6 Drawing Figures

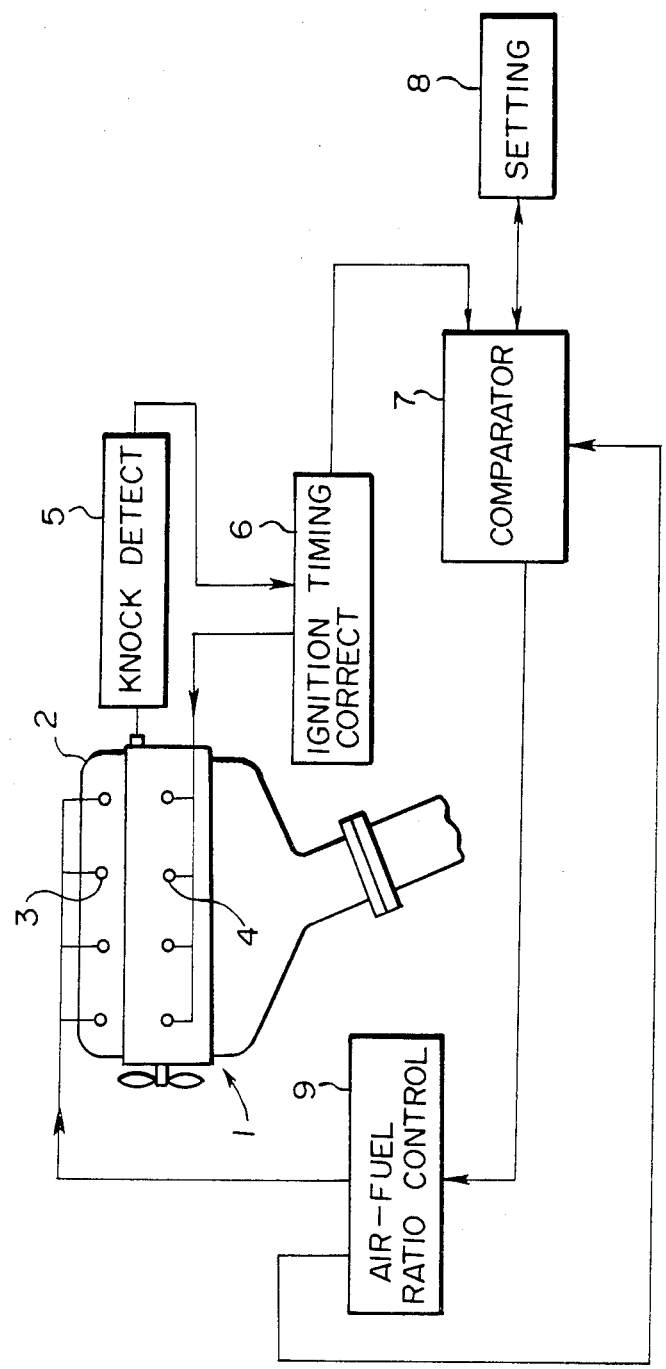

F I G. 2
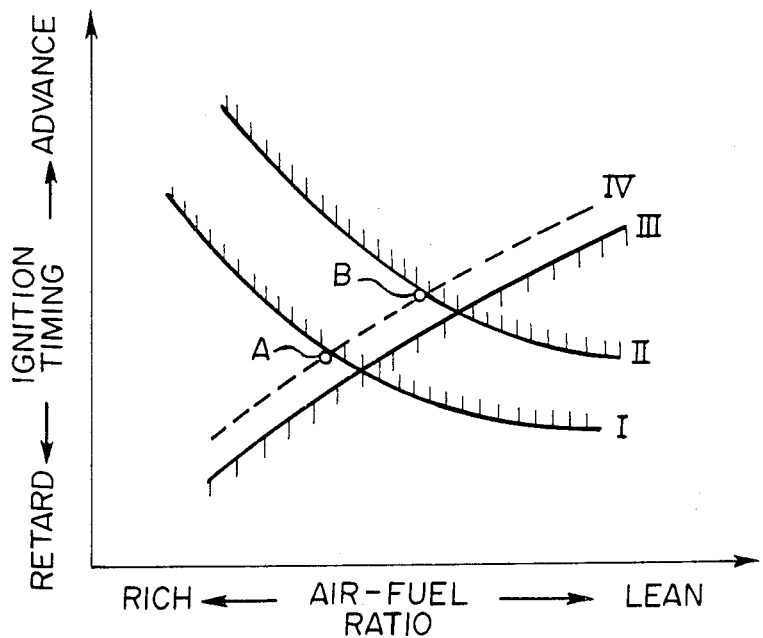
F I G. 5A
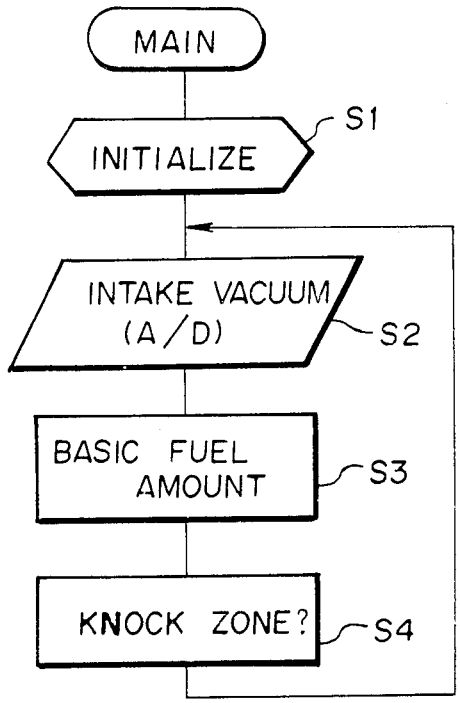

ENGINE CONTROL SYSTEM

BACKGROUND OF THE INVENTION

1. Field of the Invention

This invention relates to an engine control system for controlling an ignition timing and an air-fuel ratio to prevent spark knock of an engine.

2. Description of the Prior Art

In the engine control system disclosed in Japanese Unexamined Patent Publication No. 59(1984)-200042, the air-fuel ratio is controlled by feedback control in a feedback control zone and is controlled by open loop control in an enrich zone. In the enrich zone, the ignition timing is retarded when spark knock occurs. However, when the ignition timing is retarded to prevent spark knock, there arise problems that the engine output power is lowered to adversely affect fuel economy and the exhaust gas temperature is raised. Accordingly, in the engine control system, after the ignition timing is once retarded to eliminate the spark knock, the air-fuel ratio is controlled to advance the ignition timing without occurrence of spark knock. As is well known, engine output power is generally increased for a given operating condition of the engine as the ignition timing is advanced, and spark knock becomes less apt to occur, i.e., a critical ignition timing earlier than that at which spark knock will occur is moved toward the advance side, as the air-fuel ratio becomes richer. That is, in the engine control system, the ignition timing is retarded by a certain crank-angle when spark knock occurs and then is controlled by feedback control to an earliest timing within a range in which knock cannot occur, and then the air-fuel ratio is controlled so that the ignition timing can be approximated to a predetermined optimal value on the basis of comparison of the earliest timing determined by the feedback control and the predetermined optimal value. The predetermined optimal value is generally determined taking into account fuel economy, engine output power, exhaust gas temperature and the like. However, the engine control system disclosed in the patent publication identified above is disadvantageous in that since the predetermined optimal value is fixed irrespective of the fuel octane value, the ignition timing cannot be controlled to an optimal value following change of the fuel octane value. That is, the critical ignition timing, earlier than which spark knock will occur, changes with the air-fuel ratio, and the critical ignition timing for a given air-fuel ratio depends upon the fuel octane value and is moved toward the advance side as the octane number of the fuel increases. Accordingly, for example, if said predetermined optimal value is determined for regular gasoline, and if high octane gasoline is supplied, the ignition timing and the air-fuel ratio will be controlled to values deviated from the optimal values for high octane gasoline. That is, on the knocking limit line (the line obtained by plotting the critical ignition timing against the air-fuel ratio) for regular gasoline, the air-fuel ratio corresponding to a given ignition timing is leaner than that on the knocking limit line for high octane gasoline and accordingly, if the ignition timing is controlled, along the knocking limit line, to the optimal value for regular gasoline, the air-fuel ratio will be inevitably controlled to a value leaner than the optimal value for high octane gasoline at which the exhaust gas temperature is on the higher limit, whereby the exhaust gas temperature is adversely raised. As is well known, the exhaust gas temperature substantially depends upon the air-fuel ratio and the ignition timing.

Though the problem described above may be overcome by changing the predetermined optimal value according the fuel octane value in light of the teaching in Japanese Unexamined Patent Publication Nos. 58(1983)-57072 and 58(1983)-143169. However, this approach is disadvantageous in that the octane number of gasoline is difficult to detect, it is almost impossible to prepare the optimal values for intermediate octane numbers obtained by mixing the regular gasoline and the high octane gasoline in various proportions, and the relation between the octane number and the knocking limit changes with time.

SUMMARY OF THE INVENTION

In view of the foregoing observations and description, the primary object of the present invention is to provide an engine control system in which spark knock of the engine can be quickly eliminated by retarding the ignition timing and at the same time, the retarded ignition timing can be converged on an optimal point after the spark knock is eliminated irrespective of the fuel octane value and/or the change with time of the knocking characteristics of the engine, and which is simple in structure.

The engine control system in accordance with the present invention comprises a knock detecting means for detecting knock of an engine, an ignition timing correcting means which receives the output of the knock detecting means and retards the ignition timing when knock occurs and advances the ignition timing when knock does not occur, a setting means which sets an optimal ignition timing on which the ignition timing is to be converged to a latest ignition timing to which the ignition time can be retarded without raising the exhaust gas temperature higher than a predetermined value at the actual air-fuel ratio at that time, a comparator means which compares the actual ignition timing corrected by the ignition timing correcting means with the optimal ignition timing set by the setting means, and an air-fuel ratio control means which receives the output of the comparator means, and corrects the air-fuel ratio toward the lean side when the actual ignition timing is on the advance side of the optimal ignition timing and toward the rich side when the former is on the retard side of the latter.

The feature and the basic operation of the engine control system of the present invention will be described in detail referring to FIGS. 1 and 2, hereinbelow.

In an engine 1, the air-fuel ratio is controlled by controlling the fuel injection pulse to fuel injectors 3 and the ignition timing is controlled by controlling the ignition signal to spark plugs 4. Spark knock of the engine 1 is detected by a knock sensor 5 which detects knock of the engine by way of vibration of the engine 1. When spark knock is detected, the knock sensor 5 delivers a knock signal to an ignition timing correcting means 6.

The ignition timing correcting means 6 delays the ignition timing, i.e., the time the ignition signal to each spark plug 4 is output, when knock occurs, and advances the same when knock does not occur. That is, as the ignition timing is advanced, the engine output power is increased and spark knock is more apt to occur, and accordingly, the ignition timing correcting means 6 advances the ignition timing to a point where knock does not occur.

The ignition timing correcting means 6 delivers an ignition timing signal representing the corrected ignition timing to a comparator means 7. The comparator means 7 compares the corrected ignition timing with an optimal ignition timing on which the ignition timing is to be converged and which is set by a setting means 8. The setting means sets the optimal ignition timing to a latest ignition timing to which the ignition time can be retarded without raising the exhaust gas temperature higher than a predetermined value at the actual air-fuel ratio at that time.

The output signal of the comparator means 7 is delivered to an air-fuel ratio control means 9 which controls the air-fuel ratio by controlling the fuel injection pulse to be input into the fuel injector 3. The air-fuel ratio control means 9 controls the air-fuel ratio so that the ignition timing is moved toward the optimal ignition timing, and the output signal of the air-fuel ratio control means 9 is input into the comparator means 7 as a signal representing the actual air-fuel ratio which is used for setting the optimal ignition timing in the setting means 8.

In FIG. 2, line I represents the knocking limit line for regular gasoline and line II represents the knocking limit line for high octane gasoline. Line III represents the exhaust gas temperature limit line. When the ignition timing is advanced over the knocking limit line I when the engine 1 is charged with regular gasoline, the knock intensity will exceed an acceptable limit. Similarly, when the ignition timing is advanced over the knocking limit line II when the engine 1 is charged with high octane gasoline, the knock intensity will exceed the acceptable limit. Further, when the ignition timing is retarded over the exhaust gas temperature limited line III, the exhaust gas temperature will exceed an acceptable limit. In order to maintain reliability, the engine 1 must be operated on the retard side of the knocking limit line I or II and on the advance side of the exhaust gas temperature limit line III. Taking into account these conditions together with the fuel economy and the like, the setting means 8 sets the optimal ignition timing to a latest ignition timing to which the ignition time can be retarded without raising the exhaust gas temperature higher than the predetermined value (i.e., the acceptable limit) at the actual air-fuel ratio at that time. Though the latest ignition timing is theoretically on the exhaust gas temperature limit line III, actually the optimal ignition timing is set to a value corresponding to a point on line IV depending on the air-fuel ratio at that time. The line IV is substantially parallel to the exhaust gas temperature line III and is on the advance side of the line III in view of the safety factor. The ignition timing correcting means 6 advances the ignition timing when spark knock does not occur and retards the same when spark knock occurs, and the air-fuel ratio is corrected to return the corrected ignition timing to the original timing. Separately from the knock control effected in this manner, the ignition timing and the air-fuel ratio are controlled to optimal values represented by the intersection of the line IV and the corresponding knocking limit line. For example, in the case that the engine 1 is charged with regular gasoline, the ignition timing and the air-fuel ratio are finally controlled to the values represented by point A, and in the case that the engine 1 is charged with high octane gasoline, the ignition timing and the air-fuel ratio are finally controlled to the values represented by point B. The point representing the optimal ignition timing and air-fuel ratio will be sometimes referred to as "optimal operation point", hereinbelow.

BRIEF DESCRIPTION OF THE DRAWINGS

FIG. 1 is a schematic view showing the general arrangement of the engine control system in accordance with the present invention, FIG. 2 is a graph for illustrating the principle of operation of the engine control system of the present invention.

DESCRIPTION OF THE PREFERRED EMBODIMENT

Figure 3:
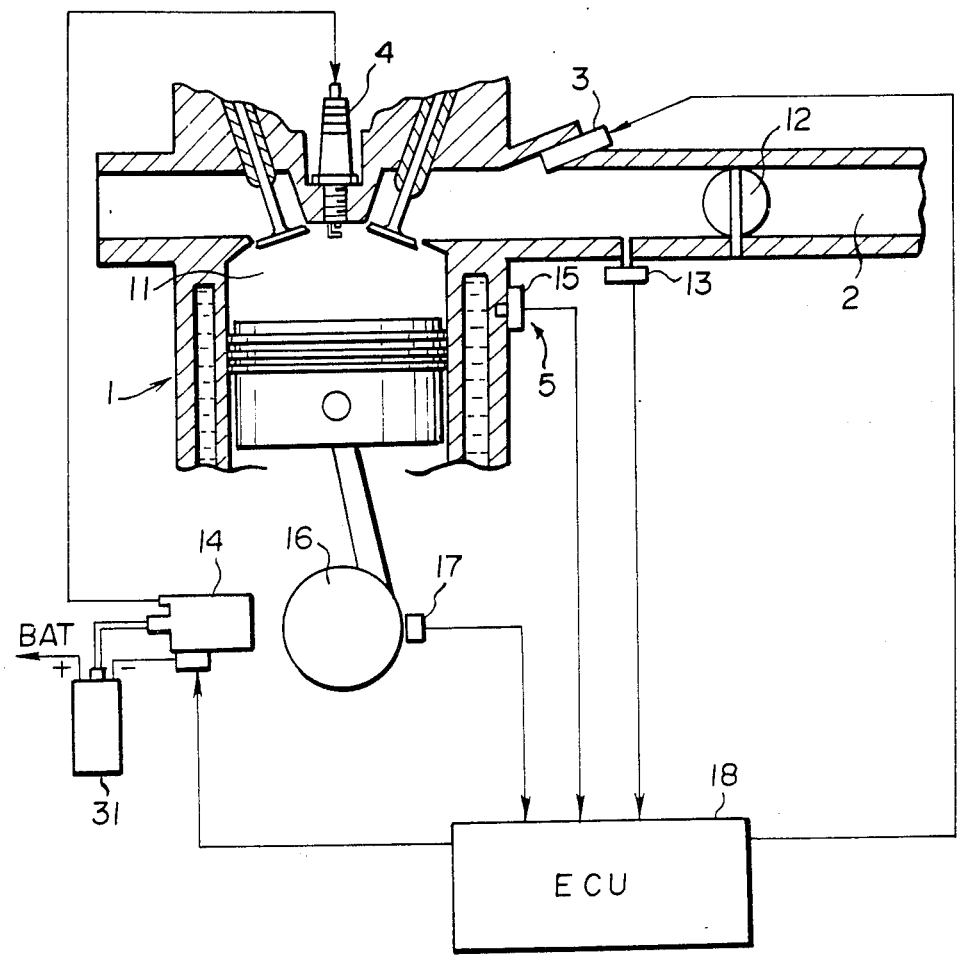
FIG. 3 is a schematic fragmentary cross-sectional view of an engine provided with an engine control system in accordance with an embodiment of the present invention.

In FIG. 3, the intake passage 2 for feeding intake air to combustion chambers 11 of the engine 1 is provided with a throttle valve 12, a pressure sensor 13 for detecting intake vacuum, and fuel injectors 3 for the respective combustion chambers 11.

The spark plugs 4 are connected to a distributor 14. A knock sensor 15 for detecting knock of the engine 1, and a crank-angle sensor 17 for detecting the engine speed through the rpm of the crankshaft 16 are provided.

The amount of fuel to be injected from the injector 3 and the ignition timing of the spark plugs 4 are controlled by a control unit 18 which may be a micro computer for example. Into the control unit 18 are input detecting signals of the pressure sensor 13, the knock sensor 15 and the crank-angle sensor 17.

The control unit 18 has functions of the ignition timing correcting means 6, the comparator means 7, the setting means 6 and the air-fuel ratio control means 9 described above in conjunction with FIG. 1, and restrains knock of the engine when knock occurs and controls the ignition timing and the air-fuel ratio to the optimal point in the manner described above.

Figure 4:
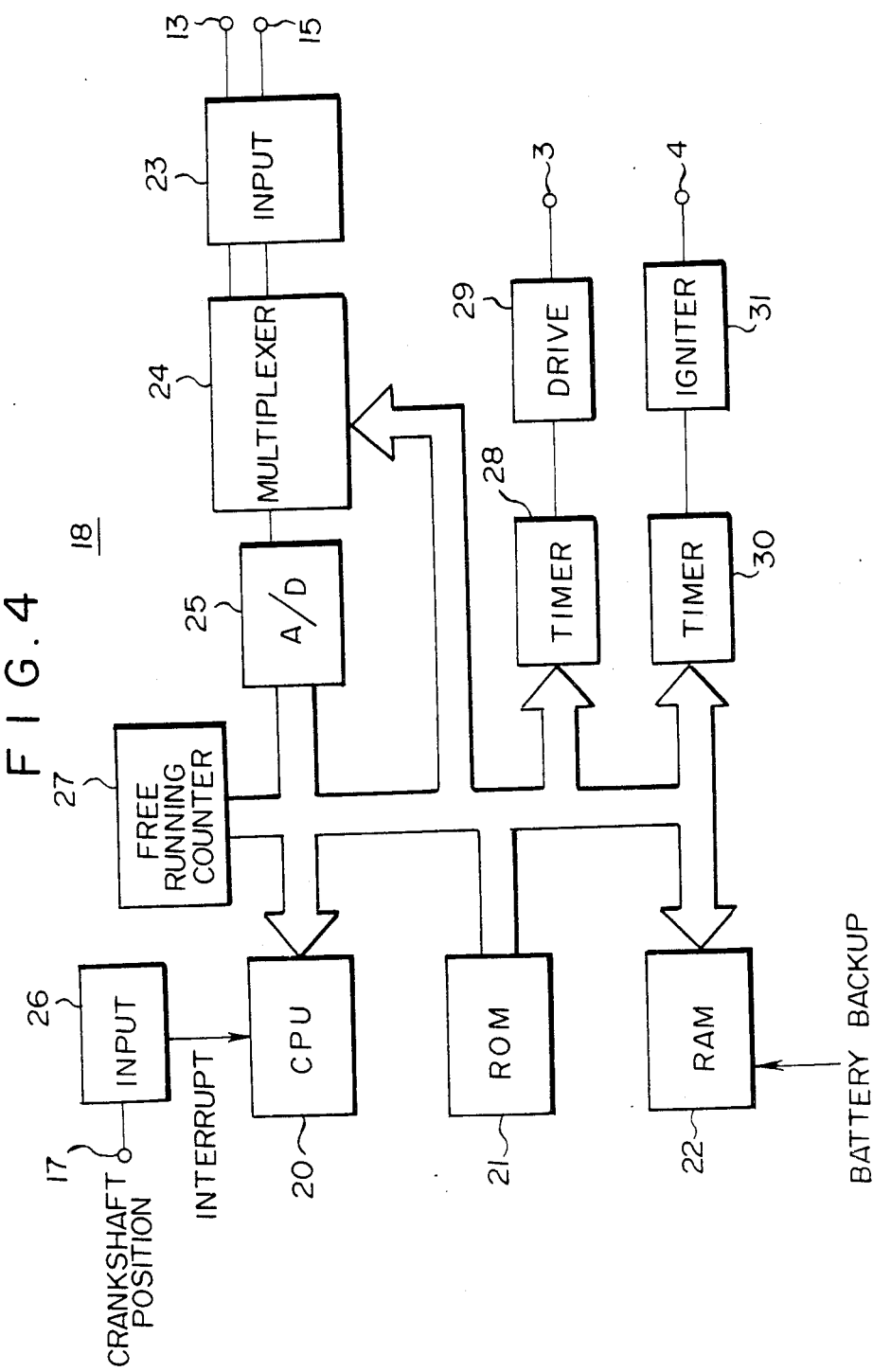
FIG. 4 is a block diagram for illustrating the structure of the control unit employed in the engine control system of FIG. 3, and FIGS. 5A and 5B are two flow charts for illustrating the operation of the control unit.

As shown in FIG. 4 showing the internal arrangement of the control unit 18, the control unit 18 comprises a CPU 20, ROM 21 and RAM 22. Into the CPU are input an intake vacuum signal from the pressure sensor 13 and a knock signal from the knock sensor 15 by way of an input circuit 23, a multiplexer 24 and an A/D converter 25. Further, a signal from the crank-angle sensor 17 is input into the CPU 20 by way of an input circuit 26 as an interrupt signal, and a signal from a free running counter 27 is input into the CPU 20. The control unit 18 delivers a fuel injection control signal to the injector 3 by way of a timer 28 and a drive circuit 29, and an ignition signal to the spark plugs 4 by way of a timer 30 and an igniter 31.

The operation of the control unit 18 will be described with reference to the flow chart shown in FIG. 5, hereinbelow. In the main routine shown in FIG. 5(A), step S1 is an initializing step. In step S2, the intake vacuum from the pressure sensor 13 is read, and in step S3, a basic advancing angle of the ignition timing and a basic fuel injection amount are calculated on the basis of the engine speed and the intake vacuum. Then in step S4, it is determined whether the engine operating condition is in a knock zone in which the engine speed is lower than a preset value and the intake vacuum is smaller than a preset value (a high load range).

Figure 5B:
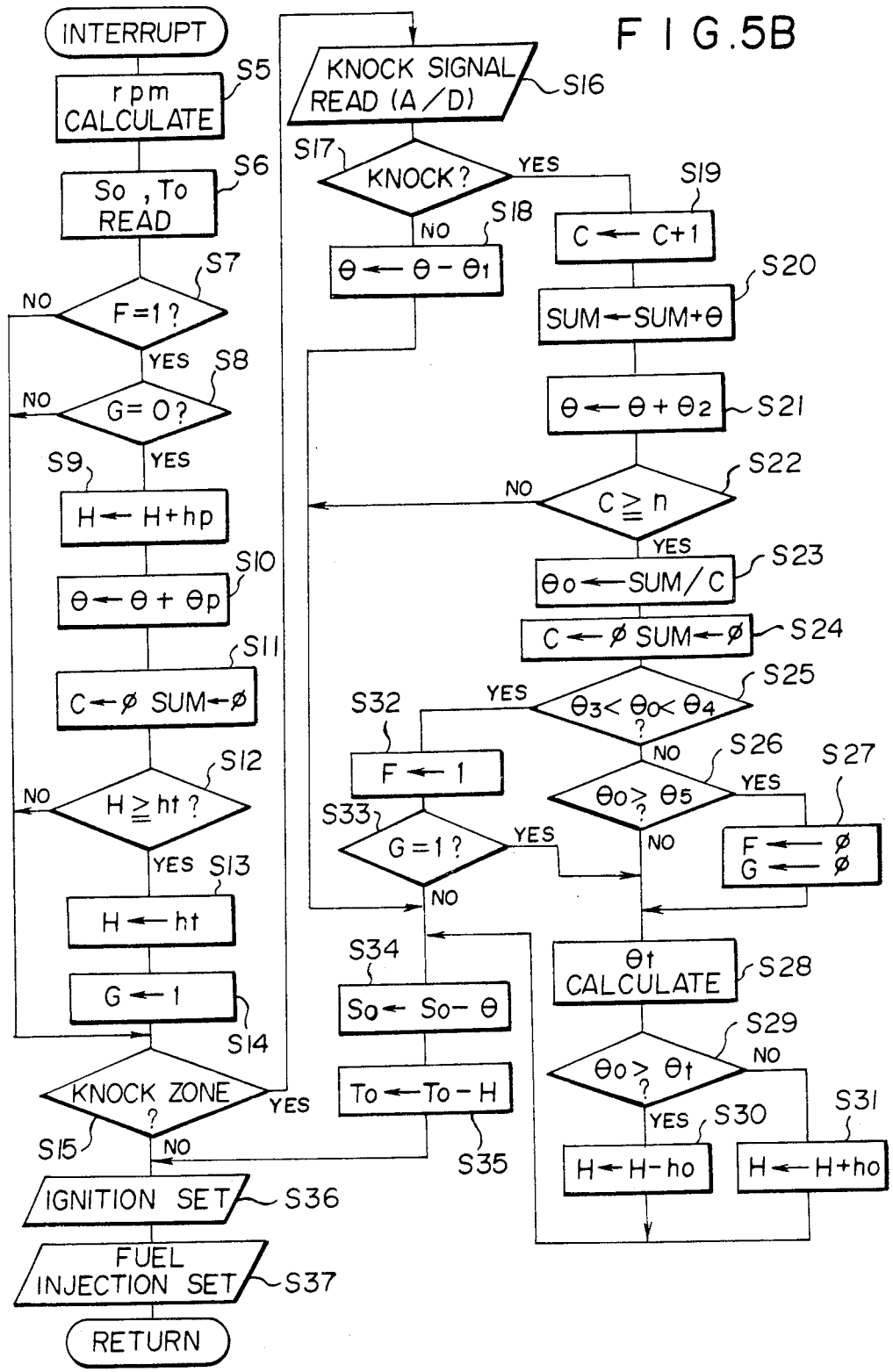

In the interrupt routine shown in FIG. 5(B), the engine speed is calculated through the interrupt period in step S5. The value of the engine speed calculated in the step S5 is used in the steps S3 and S4 in the main routine. In step S6, the basic advancing angle of the ignition timing So and the basic fuel injection amount To are read. In step S7, it is determined whether a shift-to-high-octane flag F (to be described later) has been set. When it is determined that the shift-to-high-octane flag F has not been set, the control unit 18 proceeds to step S15 and determines whether the engine operating condition is in the knock zone. When it is determined that the engine operating condition is not in the knock zone, the ignition timing is set to the basic advancing angle So in step S36, and the amount of fuel to be injected is set to the basic fuel injection amount To in step S37.

When it is determined that the engine operating condition is in the knock zone in step S15, the knock signal from the knock sensor 15 is read in step S16, and it is determined whether spark knock occurs at present by way of whether the knock signal exists in step S17. When it is determined that knock does not occur at present in the step S17, a predetermined value $\theta_1$ is subtracted from retarding angle $\theta$ in order to advance the ignition timing in Step S18.

When it is determined that knock occurs at present in the step S17, a knock counter C is increased in step S19 and the sum SUM of the retarding angles $\theta$ during knocking is calculated in step S20. Then in step S21, a predetermined value $\theta_2$ is added to the retarding angle $\theta$ in order to restrain the knock. In step S22, it is determined whether the knock counter C has reached a predetermined number of times n, and when it is determined that the knock counter C has reached the predetermined number of times n, the average retarding angle $\theta_o$ during the knocking is calculated in step S23, and the knock counter C and the register for the sum SUM of the retarding angles $\theta$ are cleared in step S24.

Then in step S25, it is determined whether the average retarding angle $\theta_o$ is in a target range for high octane gasoline the lower and upper limits of which are $\theta_3$ and $\theta_4$. When it is determined that the average retarding angle $\theta_o$ is not between the values $\theta_3$ and $\theta_4$, the average retarding angle $\theta_o$ is compared with a value $\theta_5$ for resetting the shift-to-high-octane flag F in step S26. When it is determined that the former is larger than the latter, the shift-to-high-octane flag F and a shift-to-high-octane-end flag G are reset in step S27.

The shift-to-high-octane flag F is set in step S32 when the average retarding angle $\theta_o$ during knock control enters the target range for high octane gasoline (between $\theta_3$ and $\theta_4$) as the octane number of the fuel is increased and it is determined that the average retarding angle $\theta_o$ is between $\theta_3$ and $\theta_4$ in the step S25. When the shift-to-high-octane flag F is set, the air-fuel ratio is changed to the value suitable for pure high octane gasoline in order to promote convergence to the optimal operation point in steps S7 to S14. When the octane number is reduced so that the average retarding angle $\theta_o$ goes outside the target range for high octane to exceed the value $\theta_5$, the shift-to-high-octane flag F is reset in the step S27. In step S33, it is determined whether the shift-to-high-octane-end flag G is set. The shift-to-high-octane-end flag G is set to permit change of the air-fuel ratio to a value suitable for pure high octane gasoline only once after the ignition timing (the average retarding angle $\theta_o$) enters the target range for high octane gasoline in response to increase in the octane number of the fuel. Thus, the engine operating condition can be converged on the optimal operating point even when the engine is charged with fuel having an octane number approximate to pure high octane gasoline. That is, the air-fuel ratio is changed to the value suitable for pure high octane gasoline only when the shift-to-high-octane flag F is set and at the same time the shift-to-high-octane-end flag G is reset.

When the air-fuel ratio is not to be changed to a value suitable for pure high octane gasoline, a target retarding angle $\theta t$ is calculated according to a current air-fuel ratio correction coefficient H in step S28. The target retarding angle $\theta t$ is calculated on the basis of the relation between the air-fuel ratio and the ignition timing represented by the line IV in FIG. 2. In step S29, it is determined whether the average retarding angle $\theta o$ is larger than the target retarding angle $\theta t$. When the former is larger than the latter, the ignition timing is on the retard side of the line IV. In this case, it is considered that the engine is charged with fuel having an octane number smaller than a value corresponding to the current air-fuel ratio, and a predetermined value ho is subtracted from the air-fuel ratio correction coefficient H to correct the air-fuel ratio toward the rich side in step S30. When the former is smaller than the latter, the ignition timing is on the advance side of the line IV. In this case, it is considered that the engine is charged with fuel having an octane number larger than a value corresponding to the current air-fuel ratio, and a predetermined value ho is added to the air-fuel ratio correction coefficient H to correct the air-fuel ratio toward the lean side in step S31.

Thereafter, a final ignition timing So is determined in step S34 on the basis of the retarding angle $\theta$ thus determined, and a final fuel injection amount To is determined in step S35 on the basis of the air-fuel ratio correction coefficient H thus determined. Then the ignition timing is set to the final ignition timing So in step S36 and the amount of fuel to be injected is set to the final fuel injection amount To in step S37.

When it is determined that the average retarding angle $\theta o$ enters the target range for pure high octane gasoline in the step S25 and the shift-to-high-octane flag F is set in the step S32, it is determined that the shift-to-high-octane flag F is set in the step S7 and the control unit 18 proceeds to the step S8. In the step S8, it is determined whether the shift-to-high-octane-end flag G is reset. Since the shift-to-high-octane-end flag G is reset when the air-fuel ratio is changed to the value suitable for pure high octane gasoline for the first time, it is determined in the step S8 that the shift-to-high-octane-end flag G is reset. Accordingly, the control unit 18 proceeds to the step S9 and a shift constant hp is added to the air-fuel ratio correction coefficient H in the step S9 so that the air-fuel ratio approximates the optimal value for pure high octane gasoline. Further, in the step S10, a predetermined value $\theta p$ is added to the retarding angle $\theta$ to move the ignition timing toward the retard side. After the knock counter C and the sum SUM of the retarding angles $\theta$ are cleared in the step S11, it is determined in the step S12 whether the air-fuel ratio correction coefficient H reaches a target correction value ht.

That is, to add the shift constant hp in the step S9 is for gradually shifting the air-fuel ratio to prevent torque shock, and in order to prevent occurrence of spark knock due to the shift of the air-fuel ratio, the ignition timing is retarded in the step S10. When the air-fuel ratio reaches the optimal value, it is determined in the step S12 that the air-fuel ratio correction coefficient H reaches the target correction value ht and the air-fuel ratio correction coefficient H is set to the target correction value ht in the step S13. Then the shift-to-high-octane-end flag G is set in the step S14 and once the air-fuel ratio is changed to a value suitable for pure high octane gasoline, the flag G is kept set until fuel having a lower octane number is charged to the engine.

When the engine is charged with fuel having a lower octane number, it is determined in the step S25 that the average retarding angle $\theta o$ is not in the target range for pure high octane gasoline and it is determined in the step S26 that the average retarding angle $\theta o$ is larger than the value $\theta_5$ for resetting the shift-to-high-octane flag F. Accordingly, the shift-to-high-octane flag F and the shift-to-high-octane-end flag G are reset in the step S27. Separately from the correction of the ignition timing and the air-fuel ratio for restraining spark knock, a target retarding angle $\theta t$ corresponding to the current air-fuel ratio correction coefficient H is calculated in the step S28, and the air-fuel ratio is corrected according to the difference between the average retarding angle $\theta o$ and the target retarding angle $\theta t$ in the step S30 or S31, whereby the engine operating condition is approximated to the optimal operating point corresponding to the octane number of the fuel.

When the knocking limit line is moved toward the advance side or the retard side due to change in the octane number of the fuel charged to the engine, change with time of the engine characteristics or the like, the operating point of the engine, that is, the relation between the air-fuel ratio and the ignition timing, is deviated from the line IV. In the engine control system of this embodiment, when the operating point of the engine is deviated from the line IV, the air-fuel ratio and the ignition timing is changed along the moved knocking limit line toward the line IV so that the operating point is finally converged on a point on the line IV, that is, the intersection of the moved knocking limit line and the line IV. The average ignition timing may be calculated by averaging the ignition timings when knock occurs, or by averaging the ignition timings when the ignition timing is most retarded, or in various other ways. In any case, since occurrence of spark knock is a phenomenon of probability, the average ignition timing during the knock control for controlling the engine operating condition near the knocking limit fluctuates each time it is calculated. When the optimal operating point enters the range of errors, the speed at which the engine operating condition is converged on the optimal operating point is lowered. However, by converging the engine operating condition to the optimal point when the average ignition timing enters a predetermined range, the converging speed can be increased.

We claim:

1. An engine control system comprising a knock detecting means for detecting knock of an engine, an ignition timing correcting means which receives the output of the knock detecting means and retards the ignition timing when knock occurs and advances the ignition timing when knock does not occur, a setting means which sets an optimal ignition timing on which the ignition timing is to be converged to a latest ignition timing to which the ignition time can be retarded without raising the exhaust gas temperature higher than a predetermined value at the actual air-fuel ratio at that time, a comparator means which compares the actual ignition timing corrected by the ignition timing correcting means with the optimal ignition timing set by the setting means, and an air-fuel ratio control means which receives the output of the comparator means, and corrects the air-fuel ratio toward the lean side when the actual ignition timing is on the advance side of the optimal ignition timing and toward the rich side when the former is on the retard side of the latter.

2. An engine control system as defined in claim 1 in which said air-fuel ratio control means controls the air-fuel ratio by controlling the amount of fuel to be fed to the engine, and said setting means set the optimal ignition timing according to the air-fuel ratio detected through the amount of fuel fed to the engine.

3. An engine control system as defined in claim 1 in which said optimal ignition timing set by the setting means is given in the form of a correction value for a basic ignition timing which is determined according to the engine operating condition, and said comparator means compares the actual correction value with the correction value set by the setting means.

4. An engine control system as defined in claim 1 in which when the actual ignition timing is advanced from the optimal ignition timing by an angle larger than a predetermined value, said air-fuel ratio control means corrects the air-fuel ratio toward the lean side by an amount larger than that when the actual ignition timing is advanced from the optimal ignition timing by an angle not larger than the predetermined value.

5. An engine control system comprising a knock detecting means for detecting knock of an engine, an engine operating condition detecting means, a basic ignition timing determining means which receives the output of the engine operating condition detecting means and determines a basic ignition timing, an ignition timing correcting means which receives the output of the knock detecting means and determines a correction value which retards the basic ignition timing when knock occurs and advances the basic ignition timing when knock does not occur, a setting means which sets a correction value for converging the ignition timing on an optimal ignition timing which is a latest ignition timing to which the ignition time can be retarded without raising the exhaust gas temperature higher than a predetermined value at the actual air-fuel ratio at that time, a comparator means which compares the correction value determined by the ignition timing correcting means with the correction value set by the setting means, and an air-fuel ratio control means which receives the output of the comparator means, and corrects the air-fuel ratio toward the lean side when the ignition timing after being corrected by the correction value determined by the ignition timing correcting means is on the advance side of the optimal ignition timing and toward the rich side when the former is on the retard side of the latter.

* * * * *